US007982670B2

(12) United States Patent
Mestre Pons (10) Patent No.: US 7,982,670 B2
(45) Date of Patent: Jul. 19, 2011

(54) METHOD AND SYSTEM FOR ESTIMATING DIRECTIONS-OF-ARRIVAL IN LOW POWER OR LOW SAMPLE SIZE SCENARIOS

(75) Inventor: Francesc Xavier Mestre Pons, Barcelona (ES)

(73) Assignee: Fundacio Privada Centre Technologic de Telecomunicacions de Catalunya, Castelldefels, Barcelona (ES)

( * ) Notice: Subject to any disclaimer, the term of this patent is extended or adjusted under 35 U.S.C. 154(b) by 425 days.

(21) Appl. No.: 12/281,175

(22) PCT Filed: Mar. 9, 2006

(86) PCT No.: PCT/EP2006/002167
§ 371 (c)(1),
(2), (4) Date: Aug. 29, 2008

(87) PCT Pub. No.: WO2007/101451
PCT Pub. Date: Sep. 13, 2007

(65) Prior Publication Data
US 2009/0009394 A1    Jan. 8, 2009

(51) Int. Cl.
*G01S 5/02* (2010.01)
*G01S 3/74* (2006.01)

(52) U.S. Cl. ........................................................ 342/417

(58) Field of Classification Search .................... 342/417
See application file for complete search history.

(56) References Cited

U.S. PATENT DOCUMENTS

| | | | | |
|---|---|---|---|---|
| 6,253,084 B1 * | 6/2001 | Monot | ........................... | 455/441 |
| 6,278,406 B1 * | 8/2001 | Kuwahara | ...................... | 342/417 |
| 6,311,043 B1 * | 10/2001 | Haardt et al. | .............. | 455/67.16 |
| 6,333,713 B1 * | 12/2001 | Nakagawa et al. | ........... | 342/418 |
| 6,349,218 B1 * | 2/2002 | Nakagawa et al. | ......... | 455/562.1 |
| 2003/0012262 A1 * | 1/2003 | Ribeiro Dias et al. | ........ | 375/147 |
| 2005/0285788 A1 * | 12/2005 | Xin | ............................... | 342/432 |
| 2006/0007043 A1 * | 1/2006 | Xin | ............................... | 342/417 |

OTHER PUBLICATIONS

X. Mestre, "An Improved Weighted MUSIC Algorithm for Small Sample Size Scenarios", 14th Workshop on Adaptive Sensor Array Processing, Lexington, MA 2006.*
Y.H. Choi, "ALternating minimisation Approach to Generalised MUSIC and its Performance", IEE Proc. Radar Sonar Navig, vol. 149, No. 2, Apr. 2002.*
Vyacheslav L. Girko, An Introduction to Statistical Analysis of Random Arrays, VSP, 1998, The Netherlands.

(Continued)

*Primary Examiner* — Thomas H Tarcza
*Assistant Examiner* — Frank McGue
(74) *Attorney, Agent, or Firm* — Notaro, Michalos & Zaccaria P.C.

(57) ABSTRACT

The present invention relates to a method and a system for determining the direction of arrival of one or multiple radio or acoustic waves and, more particularly, to such a method and system especially advantageous in situations where the number of available observations is small and/or the available observations are received with low power. The method significantly improves the performance of traditional subspace signal processing algorithms in the low sample size regime. The algorithm is specifically designed to provide consistent estimates even when the observation dimension has the same order of magnitude as the number of observations. This guarantees a good behavior in finite sample size situations, where the number of sensors or antennae and the number of samples have the same order of magnitude or in scenarios where the received signal power is not sufficiently high to guarantee detection via conventional one-dimensional search methods.

30 Claims, 5 Drawing Sheets

OTHER PUBLICATIONS

Ralph Schmidt, Multiple Emitter Location and Signal Parameter Estimation, Proc. of the RADC Spectrum Estimating Workshop, 1979, pp. 243-258.

Petre Stoica, et al, Preformance Study of Conditional and Unconditional Direction-of-Arrival Estimation, IEE Transactions on Aoustics, Speech and Signal Processing, 1990, p. 1783-1795 vol. 38 No. 10.

J. Capon, High-Resolution Freguency-Wavenumber Spectrum Analysis, Proceedings of the IEEE, Aug. 1969, p. 1408-1418 vol. 57, No. 8.

Y.H. Choi, Alternating Minimisation Approach to Generalised MUSIC and Its Performance, IEE Proc-Radar Sonar Navig, Apr. 2002, p. 97-10, vol. 149, No. 2.

JS Wang, et al, An Improved Music to a Estimator for RFID Positioning, The Institution of Electrical Engineers, 2002, p. 478-482 IEE Sevoy Place, London, United Kingdom.

Wenyuan Xu, et al, Design of Two MUSIC-Like Estimators Based on Bias Minimization, IEE Transactions on Signal Processing, Sep. 1996, p. 2284-2299, vol, 44 No. 9.

* cited by examiner

METHOD AND SYSTEM FOR ESTIMATING DIRECTIONS-OF-ARRIVAL IN LOW POWER OR LOW SAMPLE SIZE SCENARIOS

FIELD OF THE INVENTION

The present invention relates to a method and a system for determining the direction of arrival of one or multiple radio or acoustic waveforms and, more particularly, to such a method and system especially advantageous in situations where the number of available observations is small, or the available observations are received with low power.

STATE OF THE ART

In multiple applications, there is an especial interest in determining the direction of arrival (DoA) or also, angle of arrival, of one or multiple radio or acoustic waveforms as seen from a particular receiver. The estimation of the impinging angles becomes feasible when an array of multiple sensor or antenna elements spatially distributed in a particular region is employed. Each of the sensors is equipped with a radio-frequency/acoustic front-end and its corresponding signal processing technology. The waveforms or signals received by each of the array elements are processed together by a central processing unit that determines the direction of arrival of the different sources in the scenario. The sources might be transmitters themselves, or they might be reflectors of the acoustic or radio waveforms generated by other sources.

For example, in radar applications it is useful to estimate the exact position of different targets as seen from a given reference point. This can be done by sending a particular radio-frequency waveform and estimating the delay and the direction of arrival from which the signal is received after bouncing off from different objects in the scenario. The use of an antenna array allows for the estimation of the exact position of the target without resorting to triangularization techniques.

On the other hand, in some other applications such as mobile communications, there is an interest in estimating the position of a signal source, such a mobile station. Again, this can be effectively done by using an antenna array as a receiver. The direction of arrival of the different mobile stations that are simultaneously transmitting towards a base station can be estimated using the techniques described herein.

There is a vast amount of methods for determining the direction-of-arrival (DoAs) of the distinct sources, from which the most important contributions are: the Capon estimator [J. Capon, "High resolution frequency-wavenumber spectrum analysis", Proceedings of the IEEE, vol. 57, pp. 1408-1418, August 1969], the Maximum Likelihood (ML) method [P. Stoica and A. Nehorai, "Performance study of conditional and unconditional direction-of-arrival estimation", IEEE Transactions on ASSP, vol. 38, pp. 1783-1795, October 1990], and the super-resolution technique known as MUSIC ("MUltiple SIgnal Classification") [R. Schmidt, "Multiple emitter localization and signal parameter estimation", Proceedings of the RADC, Spectral Estimation Workshop, Rome (NY), pp. 243-258, 1979. Reprinted in "Modern Spectral Analysis II", S. B. Kesler (ed.), IEEE Press, New York, 1986].

If the number of samples is sufficiently high, the ML method gives the best performance, although this is at the expense of a much higher computational complexity (the ML solution is computed by optimizing a cost function in multiple variables and the solution is obtained from a multi-dimensional search). Both the Capon and the MUSIC spectral estimators are much more efficient in terms of computational burden, because the solution is obtained from a one-dimensional search. The difference between these two methods is the fact that the MUSIC method, contrary to the Capon solution, exploits the eigenstructure of the spatial correlation matrix of the observations. In practice, it has been shown both theoretically and experimentally, that DoA estimation techniques based on the eigenstructure methods are superior to other traditional one-dimensional search based methods such as the Capon estimator.

On the other hand, V. Girko introduced the theory of G-estimation [V. Girko, "An Introduction to Statistical Analysis of Random Arrays", The Netherlands: VSP, 1998]. This theory provides a systematic approach for deriving estimators with excellent properties in the small sample size regime.

The main drawback of subspace-based methods, such as MUSIC, is the fact that their capability of detecting closely spaced targets drops dramatically when either the number of available samples or the power of the received waveform fall below a certain threshold. Several methods have been proposed to alleviate the bad performance of the MUSIC method in the low power and/or sample size region, although most of these methods can only be applied to some particular array geometries. For example, the polynomial-root MUSIC method or the state-space approach can only operate on uniform linear array architectures (that is to say, on arrays where all the sensors/antennas are equispaced and located along a straight line). On the other hand, it has been pointed out several times in the literature that a weighted version of the MUSIC method might help improve the performance beyond the performance breakdown threshold. However, up to date, there is no clear indication on how to choose these weights in order to optimize the performance of the method in the low power and/or low sample size regime without losing the good properties of the MUSIC algorithm in more generic scenarios.

SUMMARY OF THE INVENTION

It is a primary aim of the present invention to provide a method and system for overcoming the MUSIC performance breakdown effect, allowing for proper detection of directions-of-arrival, hereinafter referred to as "DoAs", of closely located targets in situations where the number of available samples is low, or when the power of the received waveforms is not sufficiently high to guarantee the detection of their DoA by one-dimension exploration methods. As we use the teachings of the theory of G-estimation, our method will hereinafter be referred to as the GMUSIC method. Our method can be further complemented with some enhancements of the traditional MUSIC technique, such as polynomial rooting, beamspace projection, sequential estimation or spatial smoothing.

The object of the present invention is a new method and system for DoA estimation for multi-sensor or multi-antenna array receivers. The main particularity of the proposed invention is the fact that it overcomes the threshold effect of traditional eigenstructure methods, allowing for correct multiple DoA detection in situations where either the number of available samples or the power of the received waveforms are not sufficiently high to guarantee DoA detection by conventional means based on one-dimensional exploration of the angle of arrival.

The proposed method of DoA identification comprises the selection of the lowest or highest peaks of a cost function that depends on the angle of exploration. This function is constructed from the eigenvalues and eigenvectors of the estimated covariance matrix of the observation.

Another advantage of our method, when compared with the well-known improvements of the MUSIC algorithm, is that it is valid for any type of array of receiving elements, such as linear array, non-linear array, uniform array, circular array, triangular array, and so on.

The proposed method for determining the direction of arrival of at least one radio waveform, comprises the steps of: receiving at least one waveform at M receiving elements; obtaining one detected signal at the output of each of the M receiving elements; processing said M detected signals for obtaining M processed signals; sampling at N time instants said M processed signals; from the samples obtained in the previous step, creating N column vectors y(1), . . . , y(N), wherein y(n) represents, for a sampling instant n, a column vector with M rows, each of the M rows containing the sample value associated to the corresponding receiving element at that sampling instant n; from the collection of N column vectors, calculating a sample spatial correlation matrix $\hat{R}$, obtaining all the eigenvectors $\hat{e}_i$ and all the eigenvalues $\hat{\lambda}_i$ from the sample spatial correlation matrix $\hat{R}$; from all the eigenvectors $\hat{e}_i$ and all the eigenvalues $\hat{\lambda}_i$, obtaining a set of signal dependent parameters $\mu_k$; from the eigenvalues $\hat{\lambda}_i$ and the signal dependent parameters $\mu_k$, constructing a set of weights; and finding the K solutions from a certain cost function such that they fulfil a certain requirement.

Finding the K solutions from said certain cost function is done either by selecting K deepest local minima of a certain cost function, or by selecting K highest local maxima of a certain cost function.

The present invention also provides a system which comprises means adapted for carrying out the steps of the method, as well as a computer program comprising computer program code means adapted to perform the steps of the method when said program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF PREFERRED
EMBODIMENTS OF THE INVENTION

Figure 1:
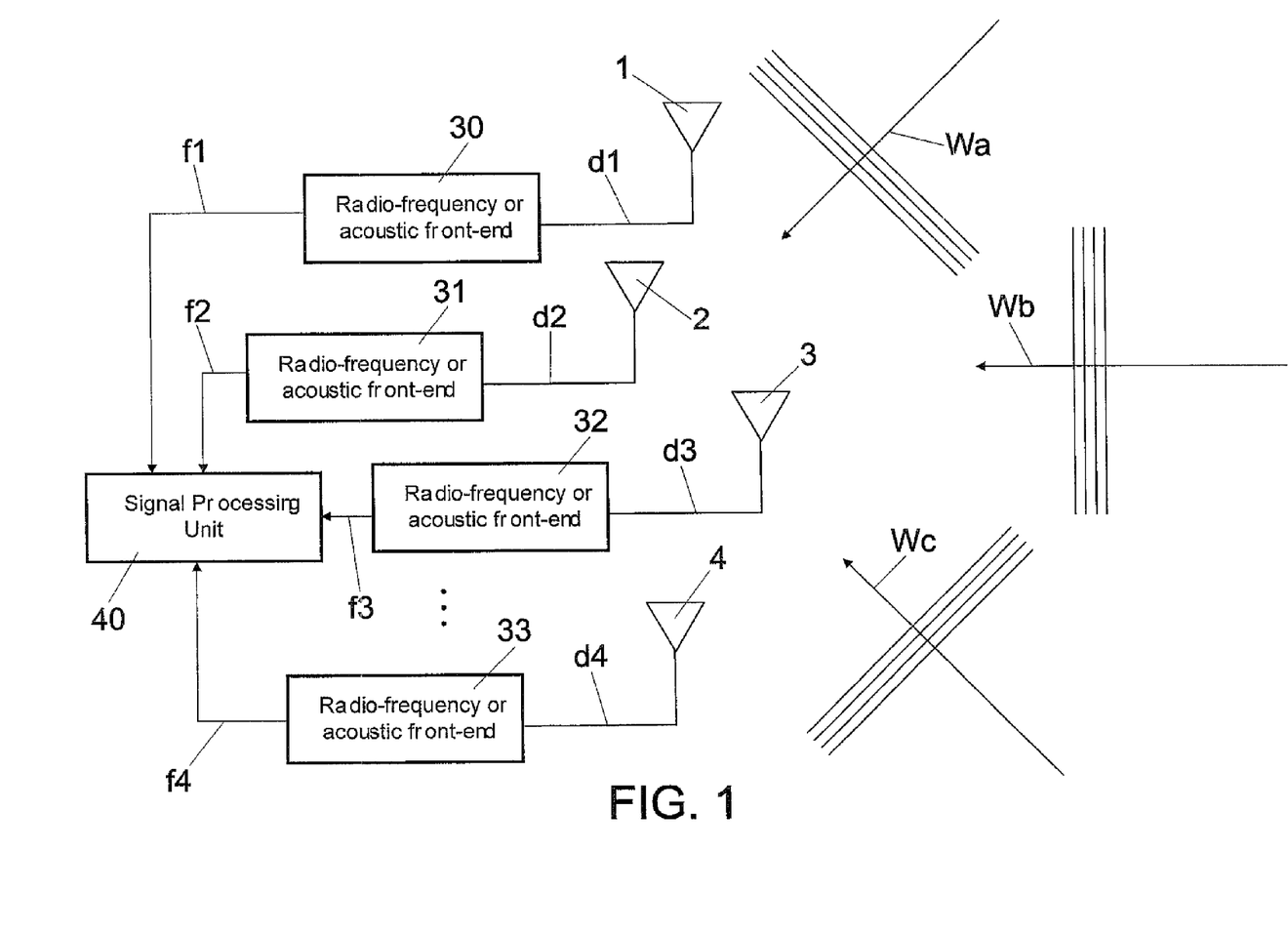
FIG. 1 is a schematic representation of the receiving system utilized for estimating the direction of arrival of one or several waveforms in accordance with the preferred embodiment of the present invention.

The implementation of the present invention can be carried out according to the setting illustrated in FIG. 1. One or several waveforms ($w_a$, $w_b$, $w_c$ . . . ) are received by at least one receiving element (1, 2, 3, 4 . . . ). These waveforms are preferably radio-frequency or microwave signals. The receiving elements are preferably a sensor array composed of multiple sensors or antennae. The one or several waveforms ($w_a$, $w_b$, $w_c$ . . . ) come from respective one or several sources, which might be transmitters themselves, or they might be reflectors of the acoustic or radio waveforms generated by other sources. The waveform or signal ($d_1$, $d_2$, $d_3$, $d_4$ . . . ) captured or detected by each one of these receiving elements (1, 2, 3, 4 . . . ) is received by a pre-processing unit or front-end (30, 31, 32, 33 . . . ) that pre-processes the signal ($f_1$, $f_2$, $f_3$, $f_4$ . . . ) so that it can be further processed by the signal processing unit (40). The signal processing unit (40) takes samples of the signals ($f_1$, $f_2$, $f_3$, $f_4$ . . . ) coming from the front-ends (30, 31, 32, 33 . . . ) at certain synchronized time instants, and generates a collection of discrete time multidimensional observations or snapshots [($f^1_1$, $f^1_2$, $f^1_3$, $f^1_4$ . . . ), ($f^2_1$, $f^2_2$, $f^2_3$, $f^2_4$ . . . ), . . . , ($f^N_1$, $f^N_2$, $f^N_3$, $f^N_4$ . . . )], wherein N is a natural number which represents the number of time instants at which samples of ($f_1$, $f_2$, $f_3$, $f_4$ . . . ) are taken.

Assuming that M receiving elements, sensors or antennae (1, 2, . . . , M) are available, that is to say, that the sensor or antenna array is formed by M receiving elements, at each sampling time n the signal processing unit (40) acquires a collection of M values ($f''_1$, $f''_2$, . . . , $f''_M$) coming from the M different front-ends (30, 31, 32, 33 . . . ). These values ($f''_1$, $f''_2$, . . . , $f''_M$) may be real-valued or complex-valued depending on the characteristics of the receiver. The M values are stacked into an M×1 column vector y(n), where n is a natural number that indexes the sampling instant associated with the observation. Hence, if the received signals or waveforms are synchronously sampled at N different time instants, the signal processing unit (40) works with a collection of N column vectors or snapshots, {y(1), . . . , y(N)}. The number N of available snapshots can be lower than, equal to or higher than the number of sensors M.

Assuming that there are K sources, which can be transmitters, targets or reflectors of the acoustic o radio waveforms generated by other sources, in the scenario, each of these column vectors can be described as $$y(n)=As(n)+n(n) \quad (1)$$

where:
s(n) is a K×1 column vector containing the samples of the signals transmitted or reflected by K different sources or reflectors.
n(n) is an M×1 column vector that contains the (thermal) noise samples generated by the front-ends (30, 31, 32, 33 . . . ) at the nth time instant.
A is an M×K matrix with columns a($\theta_1$), . . . , a ($\theta_K$), where a($\theta$) is the array response associated with a signal coming from an angle $\theta$, and $\theta_1$, . . . , $\theta_K$ are the DoAs of the K directional sources that are present in the scenario. The array response a($\theta$) is an M×1 column vector, the entries of which are functions of the angle of arrival. Since each waveform arrives at the sensor or antenna array of M receiving elements with a different angle of arrival $\theta$ (or direction of arrival), in the signal represented by equation (1), each one of the K sources contributes with a column vector M×1 a($\theta_1$) . . . a($\theta$K), which is obtained by evaluating the function a($\theta$) at the angles $\theta_1$, . . . , $\theta_K$.

These functions are assumed to be either known or obtained by some other means at the signal processing unit (40). To illustrate how this column vector a($\theta$) is constructed, consider a uniform linear array of M elements and assume that a plane waveform impinges on the array from an angle of θ with respect to the broadside of the array. Assume that the signal received at the first antenna is s(n) (that is, the transmitted signal, disregarding any delay to simplify the exposition). Then, if the bandwidth of this signal is sufficiently low, the signal received by the second antenna will be s(n)exp(j2πd/λ·sin(θ)), where: j is the imaginary unit, d is the array interelement separation, and λ is the wavelength of the impinging waveform. Furthermore, the signal received in the mth antenna will be s(n)exp(j2π(m−1)d/λ·sin(θ)). Hence, gathering the signal received at each antenna in an M×1 column vector, it turns out that one can express this column vector as s(n)·a(θ), where again s(n) is the transmitted signal and a(θ) is an M×1 with the mth entry equal to exp(j2π(m−1)d/λ·sin(θ)). In general, the column vector a(θ) can be constructed for any array geometry, and it gives the array response as a complex function of the direction of arrival θ.

As we have already said, these functions a(θ$_1$) . . . a(θ$_K$) are assumed to be either known or obtained by some other means at the signal processing unit (40).

In principle, if the receiving chains were ideal, knowing the geometry of the array of receiving elements would be enough to know a(θ). Nevertheless, in practice, the receiving chains are not ideal, but they add a certain amount of distortion. For this reason, in this type of architectures of arrays of receiving elements, it is usual to either perform the step of finding out the form of the function a(θ), or correct the response of the receiving chains in order to obtain the desired function a(θ). This process is sometimes called "array calibration". In order to find out the form of the function a(θ), reference signals are usually introduced in the antennae or sensors, these reference signals simulating waveforms coming from the direction θ. Then, the response of the receiving chains is measured at the signal processing unit (40), and the result of this measures is called a(θ). In principle, this process of calibration must be done for any value of θ within the exploration margin, such that the collection of all the possible functions a(θ) is obtained for every value of θ. However, since the process of calibration is done prior to the exploration itself, in practice it is impossible to know a(θ) for any value of θ (the experiment would have to be repeated for infinite values of θ). That is why, in practice, a collection of as many discrete values of θ as possible and as close to each other as possible, is selected, in order to evaluate and know the function a(θ) during the process of calibration.

Later on, while the algorithm of detection of directions-of-arrival is being executed, the cost function η(θ) is normally evaluated for the values of θ for which the function a(θ) is known, by interpolating the rest of the values of θ.

As far as planar arrays are concerned, that is to say, arrays in which the receiving elements are distributed on a plane, the function a(θ) depends on two angles (elevation and azimuth) instead of on one angle (this being the case for linear arrays, that is to say, arrays in which the receiving elements are distributed on a straight line).

In summary, θ can be either a parameter or a vector or parameters, whose values are angles that define the direction of arrival.

The array of M receiving elements (1, 2, 3, 4 . . . ) can also be calibrated as follows: exposing a collection of reference signals to the array of M receiving elements (1, 2, 3, 4 . . . ); measuring, at the signal processing unit (40), the response of the received reference signals obtained at the output of the M pre-processing units (30, 31, 32, 33, . . . ), and modifying the response of the M pre-processing units (30, 31, 32, 33, . . . ) in such a way that the signals measured at the output of the M pre-processing units (30, 31, 32, 33, . . . ) are as close as possible to the reference signals inserted in the first step.

Figure 2:
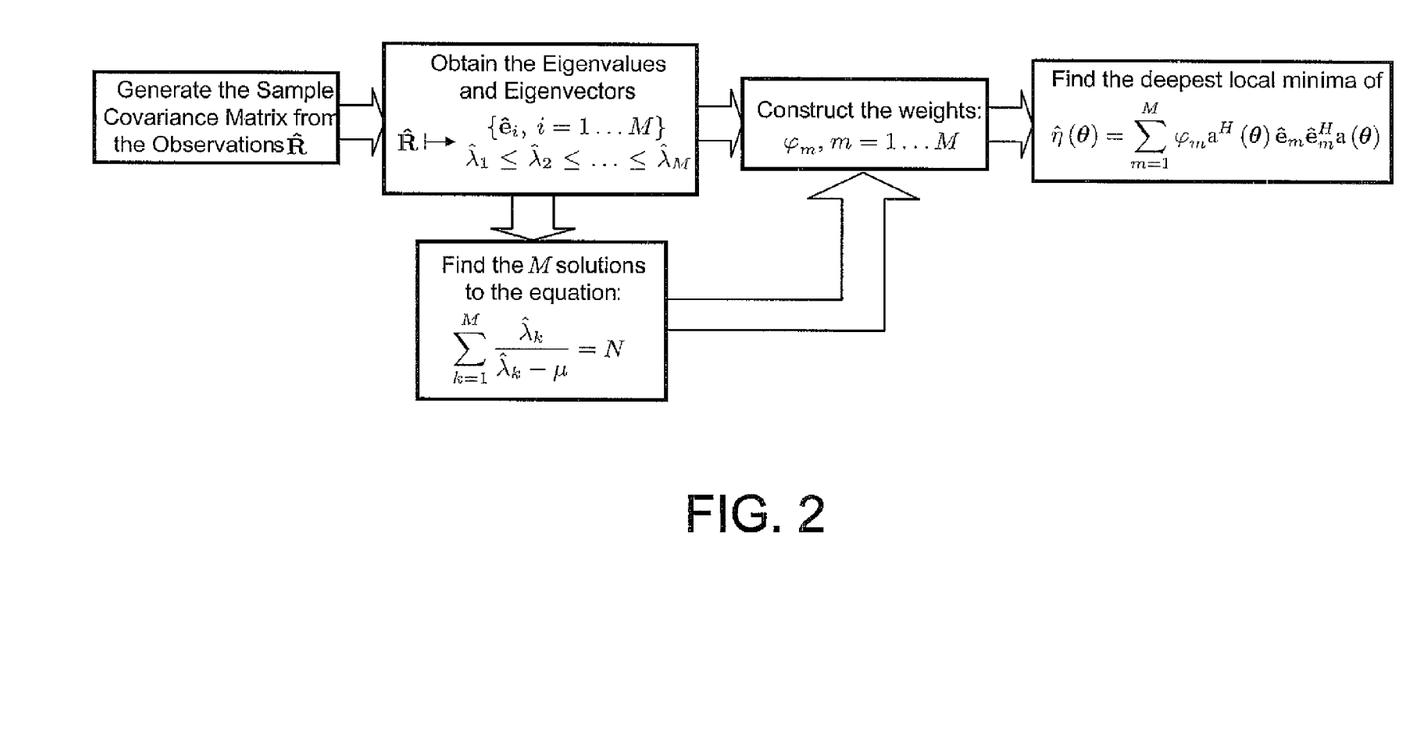
FIG. 2 is a function block diagram of the steps carried out by a preferred method of the present invention.

FIG. 2 illustrates a preferred method for obtaining the directions of arrival θ$_1$, . . . , θ$_K$ from the observations {y(1), . . . , y(N)}. The proposed method uses the teachings of the theory of G-estimators introduced in the "State of the Art", and is referred to as GMUSIC. As opposed to the traditional MUSIC algorithm, GMUSIC is designed to provide consistent estimates of the DoAs when both the sample size and the number of sensors or antennas have the same order of magnitude. This ensures a significant improvement of the performance in the low power and/or low sample size regime.

The MUSIC algorithm provides consistent results of the estimated directions-of-arrival or angles-of-arrival when N is high but M remains fixed, that is to say, when N is high relative to M. On the contrary, our algorithm provides consistent and reliable results when both N and M are high, that is to say, when M and N are comparable to each other in terms of order of magnitude. In practice, this means that our algorithm behaves in a very reliable way even if the number of samples N is not much higher than the number of sensors or antennae M. This does not happen in the original MUSIC algorithm. Therefore, our algorithm behaves much better than the MUSIC algorithm in the "low-sample size regime".

The same reasoning applies to the low-power regime. It is well known that, in every algorithm of directions-of-arrival detection or spectral estimation, the higher the power of the signals to be detected is, the less number of samples is needed in order to have a reliable estimation of the DoA of the signals. Since our algorithm allows good detection with a low number of samples with respect to the MUSIC algorithm, we are able to detect signals whose power is low with respect to the signal power which the MUSIC algorithm would require in order to detect those signals, for the same number of samples.

The method comprises the following steps:
1. From the collection of N column vectors or snapshots, {y(1), . . . , y(N)}, calculate a sample spatial correlation matrix or sample covariance matrix $\hat{R}$.

In a preferred embodiment, this sample spatial correlation matrix takes the following form:

$$\hat{R} = \frac{1}{N}\sum_{n=1}^{N} y(n)y^H(n) \quad (2)$$

where $(\cdot)^H$ denotes transpose if we are dealing with real-valued signals, and transpose conjugate if we are dealing with complex-valued signals. However, this sample spatial correlation matrix is not limited to this form (2), but the sample spatial correlation matrix $\hat{R}$ can take any other form from the ones known in the art.

2. Obtain the eigenvalues and eigenvectors of the matrix $\hat{R}$. They are denoted as $\{\hat{e}_k, k=1 \ldots M\}$ and $\hat{\lambda}_1 \leq \hat{\lambda}_2 \leq \ldots \leq \hat{\lambda}_M$, respectively.

3. Obtain all the distinct solutions to the following equation in μ:

$$\sum_{k=1}^{M} \frac{\hat{\lambda}_k}{\hat{\lambda}_k - \mu} = N \quad (3)$$

these solutions are ordered as $\mu_1 \leq \ldots \leq \mu_M$.

If $M \leq N$, these M solutions are, in principle, all different. If some of values of $\hat{\lambda}_k$ are not different, that is to say, they are repeated in the list $\{\hat{\lambda}_1, \ldots, \hat{\lambda}_M\}$, then the value $\mu_k$ is also repeated in the list $\{\mu_1, \ldots, \mu_M\}$ as many times as $\hat{\lambda}_k$ is also repeated in the list $\{\hat{\lambda}_1, \ldots, \hat{\lambda}_M\}$.

If $M>N$, we set $\mu_1 = \ldots = \mu_{M-N} = 0$, so that $\mu_{M-N+1} \leq \ldots \leq \mu_M$ contain the positive solutions to said equation in $\mu$. These solutions are, in principle, all different. Again, if some of values of $\hat{\mu}_k$ are not different, that is to say, they are repeated in the list $\{\hat{\mu}_{M-N+1}, \ldots, \hat{\mu}_M\}$, then the value $\mu_k$ is also repeated in the list $\{\mu_{M-N+1}, \ldots, \mu_M\}$ as many times as $\hat{\lambda}_k$ is also repeated in the list $\{\hat{\lambda}_{M-N+1}, \ldots, \hat{\lambda}_M\}$.

4. Construct the following weights $$\varphi_m = \begin{cases} 1 & m \leq [M-N]^+ \\ 1 - \Phi_m + \Psi_m & [M-N]^+ + 1 \leq m \leq M-K \\ -\Phi_m & m > M-K \end{cases} \quad (4)$$

$$\Phi_m = \sum_{k=[M-N]^++1}^{M-K} \frac{\hat{\lambda}_m(\hat{\lambda}_k - \mu_k)}{(\hat{\lambda}_m - \hat{\lambda}_k)(\hat{\lambda}_m - \mu_k)} \quad (5)$$

$$\Psi_m = \sum_{\substack{k=[M-N]^++1 \\ k \neq m}}^{M} \frac{\hat{\lambda}_k(\hat{\lambda}_m - \mu_m)}{(\hat{\lambda}_k - \hat{\lambda}_m)(\hat{\lambda}_k - \mu_m)} \quad (6)$$

where $$|M-N|^+ = \begin{cases} M-N & \text{if } M > N \\ 0 & \text{otherwise} \end{cases}.$$

5. The estimated DoAs are chosen as either by selecting the K deepest local minima of the cost function $f(\eta(\theta))$, where $f(\cdot)$ is an increasing real-valued function, or by selecting the K highest local maxima of the following cost function $g(\eta(\theta))$, where $g(\cdot)$ is a decreasing real-valued function, and wherein $$\eta(\theta) = a^H(\theta)\left(\sum_{m=1}^{M}\varphi_m \hat{e}_m \hat{e}_m^H\right)a(\theta). \quad (7)$$

Observe the similarity with the traditional MUSIC method, which selects the estimated DoAs as the K deepest local minima of the function $$\eta_{MUSIC}(\theta) = a^H(\theta)\left(\sum_{k=1}^{M-K} \hat{e}_k \hat{e}_k^H\right)a(\theta). \quad (8)$$

The present invention exploits the information from all the eigenvectors, not only of those associated with the lowest eigenvalues (as it is the case in the traditional MUSIC method). Next, it will be shown that the present invention overcomes the performance breakdown of the MUSIC method in low power or low sample size scenarios.

Figure 3:
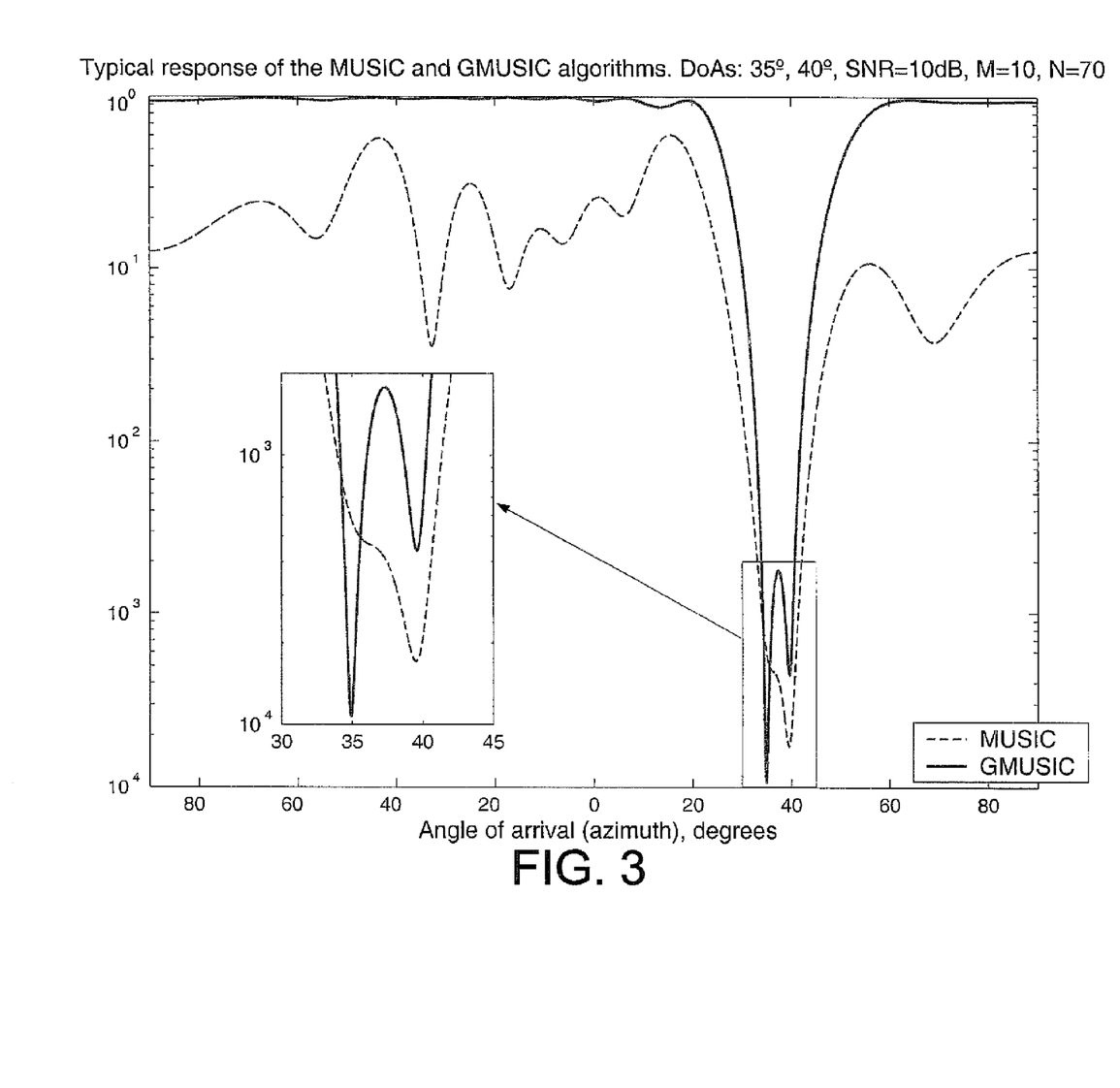
FIG. 3 is a graph of a particular instance of the cost function used for directions-of-arrival "DoA" extraction as obtained in practicing the described method.

FIG. 3 is a graph showing a particular instance of the functions in (7) and (8) above as a function of the angle of arrival, in a situation where two point sources were located at an azimuth of 35° and 40° and their signals were received in Gaussian white noise. The sources illuminated a uniform linear array of sensors or antennas with M=10 elements disposed linearly with an inter-element separation equal to half the wavelength of the impinging waveforms. In this example, a total of N=70 snapshots were available at the receiver, and the signals were received with a power 10 dB higher than the background noise power. In this particular realisation of the experiment, the traditional MUSIC method is unable to distinguish the two directional sources, and the deepest local minima were located at 39.51° and −32.82°. With the proposed GMUSIC invention, the system is able to recognize two angular sources at 34.92° and 39.58°, very close to the actual values of the source locations.

Figure 4:
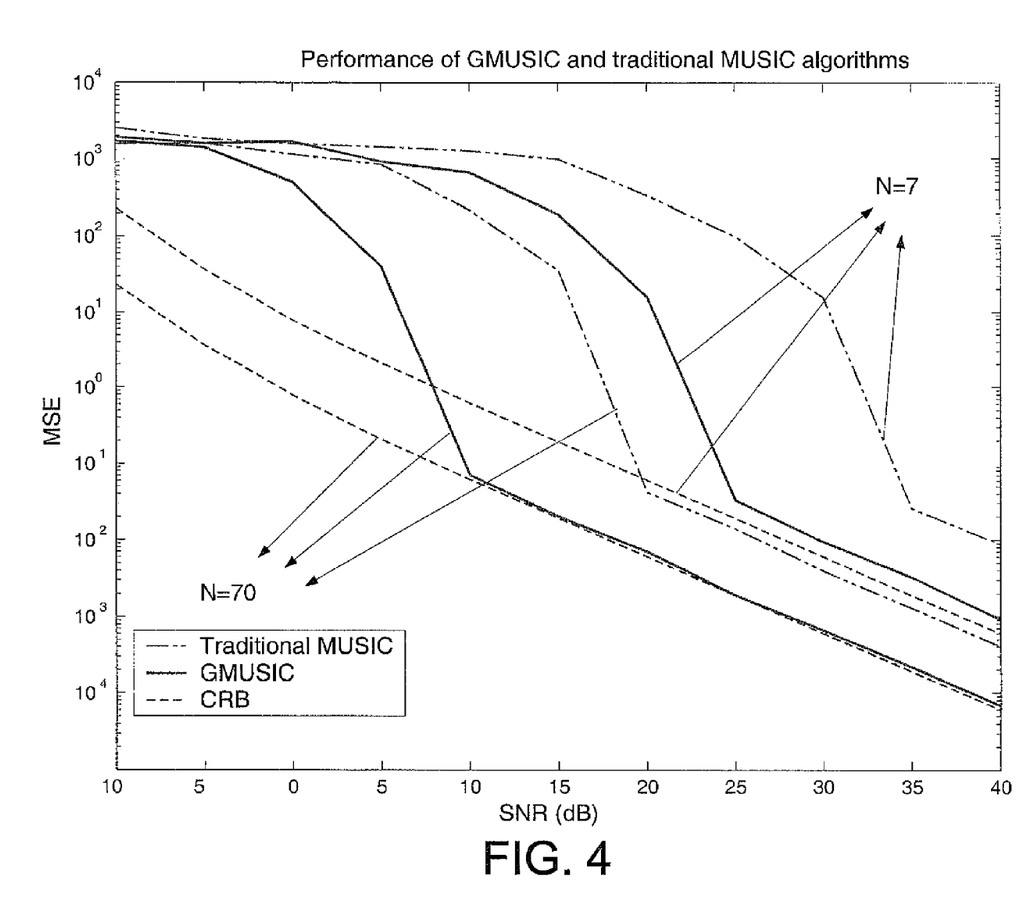
FIG. 4 and FIG. 5 are graphs of the results obtained from practicing the method or our preferred embodiment in terms of mean squared error and probability of detection, respectively.

FIG. 4 compares the mean squared error obtained by averaging 500 realisations of the proposed and traditional MUSIC methods when N=7 and N=70 snapshots were available at the array. The scenario was the same as in FIG. 3. Results are shown for different value of the signal-to-noise ratio (SNR), which is the quotient between the power of the received signals (assumed equal for the two sources) and the power of the background omni directional noise. The unconditional Cramér-Rao Bound (CRB), that is to say, the lowest variance that can be achieved with an unbiased estimator of the direction of arrival, is also shown for informative purposes. Observe that GMUSIC method presents an SNR threshold much lower than the traditional MUSIC. Furthermore, the proposed approach shows also a better performance in the high SNR region.

Figure 5:
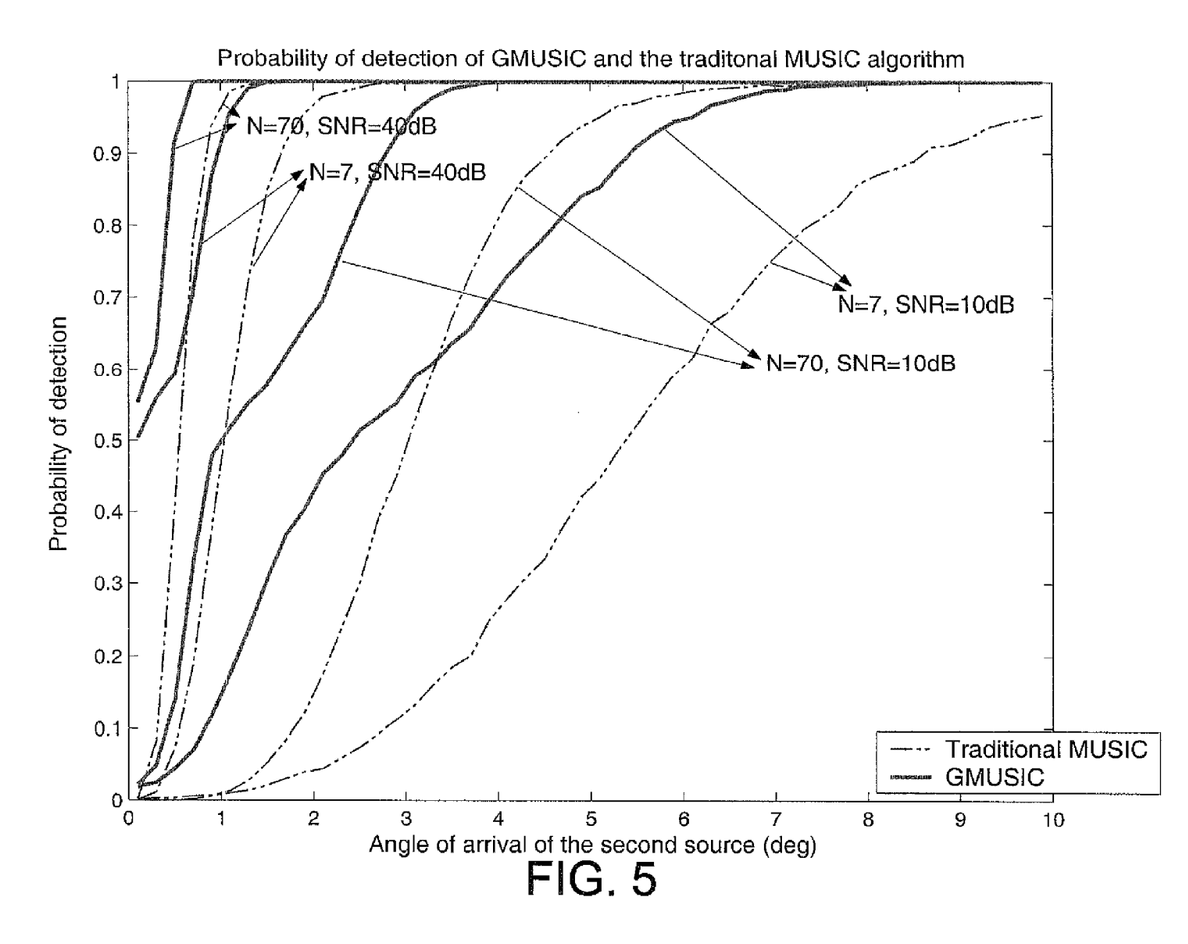

FIG. 5 represents the probability of detection of the traditional MUSIC and the GMUSIC systems, taken from an average of $10^4$ realisations. The probability of detection defined as $$Prob\left[\eta\left(\frac{\theta_1 + \theta_2}{2}\right) > \frac{\eta(\theta_1) + \eta(\theta_2)}{2}\right],$$

where $\theta_1$ and $\theta_2$ are the DoAs of two point sources in the simulated scenario. In particular, we fixed $\theta_1=0°$ whereas $\theta_2$ varied from 0° to 10°. Results are shown for two values of the sample size, N=7 and N=70, and two values of the SNR, namely SNR=10 dB and SNR=40 dB. It is experimentally demonstrated that the GMUSIC method also overcomes the traditional MUSIC in terms of probability of detection of two closely spaced sources.

As already mentioned in this description, our method can be further complemented with some enhancements of the traditional MUSIC technique, such as polynomial rooting, beamspace projection, sequential estimation or spatial smoothing, which are shown in the following preferred embodiments.

Thus, when the method is applied to a uniform linear array or receiving elements, the DoAs can also be estimated using a trivial modification of our method as previously defined, as follows. This procedure is usually referred to as polynomial rooting.

Define the M×M matrix $$\Gamma = \sum_{k=1}^{M} \varphi_k \hat{e}_k \hat{e}_k^H$$

and let $\Gamma_{m,n}$ denote the entry corresponding to the mth row and the nth column.

Consider the complex-valued polynomial $$D(z) = \sum_{l=-(M-1)}^{M-1} \alpha_l z^{M-l-1}$$

wherein $$\alpha_l = \begin{cases} \sum_{m=1}^{M-l} \Gamma_{m,m+l} & l = 0 \ldots (M-1) \\ \alpha_{-l}^* & l = -(M-1) \ldots -1 \end{cases}$$

and where (•)* denotes complex conjugate.

The DoAs are estimated as the values $$\theta_1 = \arcsin\left(\frac{\lambda}{2\pi d}\arg(z_1)\right)$$
$$\vdots$$
$$\theta_K = \arcsin\left(\frac{\lambda}{2\pi d}\arg(z_K)\right)$$

where d denotes the distance between the elements of the array, $\lambda$ is the wavelength of the impinging waveforms, arg(•) denotes the argument of a complex number, and where $z_1 \ldots z_K$ are chosen out of the 2(M−1) roots of the complex polynomial D(z), denoted by {z(k),k=1 ... 2(M−1)}, as those that either minimize the quantity $f(fD(\exp(j\arg(z_k)))|)$, wherein f(•) is an increasing real-valued function, or maximize the quantity $g(|D(\exp(j\arg(z_k)))|)$, wherein g(•) a decreasing real-valued function, and wherein j is the imaginary unit, arg(•) denotes the argument of a complex number and || denotes the module of a complex number.

Another procedure that can be incorporated into the method as previously proposed herein, when applied to uniform linear arrays of receiving elements, is spatial smoothing. This method consists in devoting spatial degrees of freedom to improving the estimation of the spatial covariance matrix. In this technique, the array of M elements is divided into $M_{ss}$ smaller sub-arrays, each containing L sensors or antennas. If there is no overlapping between the $M_{ss}$ smaller sub-arrays, then $M_{ss} \times L = M$. If, on the contrary, there is overlapping between the $M_{ss}$ smaller sub-arrays, then $M_{ss} \times L > M$. Each of the N column vectors y(1), ..., y(N) is divided into $M_{ss}$ smaller column vectors $y_{Mss}(1), \ldots, y_{Mss}(N)$, each of said smaller column vectors having L rows;

The covariance matrix is estimated as follows. First, the covariance or sample spatial correlation matrix at each of the $M_{ss}$ subarrays is estimated as the corresponding sample correlation matrix in (2) or using any other estimation of the spatial correlation matrix as known in the art. That is to say, $M_{ss}$ sample spatial correlation matrices at each of the $M_{ss}$ smaller subarrays are calculated. Second, an L×L covariance matrix estimate $\hat{R}$ is constructed by averaging the $M_{ss}$ covariance matrices obtained in the previous step. Let $\alpha_{ss}(\theta)$ denote a column vector formed by selecting the first L rows of $\alpha(\theta)$. The method consists of replacing $\alpha(\theta)$ with $\alpha_{ss}(\theta)$ and the sample covariance matrix $\hat{R}$ by the estimation described above. Then, either K deepest local minima of the following cost function $f(\eta(\theta))$, wherein f(•) is an increasing real-valued function, or K highest local maxima of the following cost function $g(\eta(\theta))$, where g(•) is a decreasing real-valued function, are calculated, wherein $$\eta(\theta) = a_{ss}^H(\theta)\left(\sum_{m=1}^{M}\varphi_m \hat{e}_m \hat{e}_m^H\right)a_{ss}(\theta).$$

Another possible modification of our algorithm as previously described, that may lead to further improved results, follows from the sequential detection approach. Instead of selecting the K deepest local minima (or K highest local maxima) of the cost function in (7), namely $$\eta(\theta) = a^H(\theta)\left(\sum_{m=1}^{M}\varphi_m \hat{e}_m \hat{e}_m^H\right)a(\theta),$$

the approach estimates the DoAs following a process of K iterations, wherein at the kth iteration, k=1 ... K, the kth DoA is selected as either the corresponding minimum of the cost function $f(v_k(\theta))$, wherein where f(•) is an increasing real-valued function, or the corresponding maximum of the cost function $g(v_k(\theta))$, wherein g(•) is a decreasing real-valued function, and wherein $$\vartheta_k(\theta) = b_k^H(\theta)\left(\sum_{m=1}^{M}\varphi_m \hat{e}_m \hat{e}_m^H\right)b_k(\theta)$$

where $$b_k(\theta) = \frac{[I - A_k(A_k^H A_k)^{-1}A_k^H]a(\theta)}{\|[I - A_k(A_k^H A_k)^{-1}A_k^H]a(\theta)\|},$$

$$A_k = [a(\theta_1), \ldots, a(\theta_{k-1})]$$

and where $\theta_1, \ldots, \theta_{k-1}$ are the DoAs detected in previous iterations and ||•|| denotes the Euclidean norm of a vector.

The method proposed herein is also applicable to the case where a linear transformation is applied to the observations or the sample covariance matrix in order to improve the properties of the DoA estimation procedure.

For example, it is common practice in this type of applications to multiply the receiving snapshots by a $M_b \times M$ matrix B, where $M < M_b$. This procedure is usually referred to as beamspace projection. The matrix B is designed taking into account the array geometry in order to enhance the resolution of the algorithm across certain regions of DoAs of interest. In other words, the values of the matrix B depend on the array geometry of the receiving elements. Our method can be trivially modified to operate in this situation. Instead of using the sample covariance matrix $\hat{R}$ in (2), one must use the following $M_b \times M_b$ transformed version thereof $$\hat{R}_B = B^H\left(\frac{1}{N}\sum_{n=1}^{N}y(n)y^H(n)\right)B$$

From this point, the DoAs of the signals of interest are estimated by either selecting K deepest local minima of the cost function $f(\eta_b(\theta))$, wherein f(•) is an increasing real-valued function, or selecting K highest local maxima of the cost function $g(\eta_B(\theta))$, wherein g(•) is a decreasing real-valued function, and wherein $$\eta_B(\theta) = \frac{a^H(\theta)B\left(\sum_{m=1}^{M}\varphi_m^B \hat{e}_m^B (\hat{e}_m^B)^H\right)B^H a(\theta)}{a^H(\theta)BB^H a(\theta)}$$

where $\{\hat{e}_m^B, m=1 \ldots M\}$ denote the eigenvectors of $\hat{R}_B$ and where the weights $\{\phi_m^B, m=1 \ldots M\}$ are constructed as $\phi_m$ replacing $\hat{R}$ with $\hat{R}_B$.

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for determining the direction of arrival of at least one radio waveform ($w_a$), comprising the steps of:

receiving at least one waveform ($w_a$) by M receiving elements (1, 2, 3, 4 ...), M being a natural number and M>1, and obtaining one detected signal ($d_i$, $d_2$, $d_3$, $d_4$ ...) at the output of each of the M receiving elements (1, 2, 3, 4 ...);

processing said M detected signals ($d_i$, $d_2$, $d_3$, $d_4$ ...) at M pre-processing units (30, 31, 32, 33 ...) for obtaining M processed signals ($f_1$, $f_2$, $f_3$, $f_4$ ...);

sampling at N time instants said M processed signals ($f_1$, $f_2$, $f_3$, $f_4$ ...) at a signal processing unit (40), N being a natural number, for obtaining corresponding sample values;

from the sample values obtained in the previous step, creating N column vectors $y(1)$, ..., $y(N)$, wherein $y(n)$ represents, for a sampling instant n, a column vector with M rows, each of the M rows containing the sample value associated to the corresponding receiving element (1, 2, 3, 4 ...) at that sampling instant n;

from the collection of N column vectors $y(1)$, ..., $y(N)$, calculating a sample spatial correlation matrix $\hat{R}$;

obtaining all the eigenvectors $\hat{e}_k$, where $k=1 \ldots M$, and all the eigenvalues $\hat{\lambda}_1 \leq \hat{\lambda}_2 \leq \ldots \leq \hat{\lambda}_M$ from said sample spatial correlation matrix $\hat{R}$;

the method being characterised in that it further comprises the steps of:

from all the eigenvectors $\hat{e}_k$ and all the eigenvalues $\hat{\lambda}_1 \leq \hat{\lambda}_2 \leq \ldots \leq \hat{\lambda}_M$ obtained in the previous step, obtaining a set of signal dependent parameters $\mu_k$, where $k=1 \ldots M$;

from the eigenvalues $\hat{\lambda}_1 \leq \hat{\lambda}_2 \leq \ldots \leq \hat{\lambda}_M$ and the signal dependent parameters $\mu_k$ previously obtained, constructing a set of weights;

finding K solutions from a certain cost function such that said K solutions fulfil a certain requirement.

2. The method according to claim 1, wherein N>M, N and M being natural numbers.

3. The method according to claim 1, wherein N=M, N and M being natural numbers.

4. The method according to claim 1, wherein N<M, N and M being natural numbers.

5. The method according to claim 1, wherein the step of receiving at least one waveform ($w_a$) is done by an array of M sensor or antenna elements (1, 2, 3, 4 ...).

6. The method according to claim 1, wherein there are K sources, each of them emitting a waveform.

7. The method according to claim 1, further comprising the step of acquiring and storing, at the signal processing unit (40), the values of a column vector $a(\theta)$, said column vector $a(\theta)$ having M rows corresponding to respective M receiving elements, each of the M rows comprising a function which depends on the direction of arrival $\theta$ that is to be explored.

8. The method according to claim 7, further comprising the step of calibrating the array of M receiving elements as follows:

exposing a collection of reference signals to the array of M receiving elements, said reference signals simulating waveforms coming from the direction $\theta$;

measuring, at the signal processing unit (40), the response of the received reference signals obtained at each of the M receiving elements, thereby obtaining $a(\theta)$.

9. The method according to claim 1, further comprising the step of calibrating the array of M receiving elements (1, 2, 3, 4 ...) as follows:

exposing a collection of reference signals to the array of M receiving elements (1, 2, 3, 4 ...);

measuring, at the signal processing unit (40), the response of the received reference signals obtained at the output of the M pre-processing units (30, 31, 32, 33 ...);

modifying the response of the M pre-processing units (30, 31, 32, 33 ...) in such a way that the signals measured at the output of the M pre-processing units (30, 31, 32, 33 ...) are as close as possible to the reference signals inserted in the first step.

10. The method according to claim 1, wherein the step of obtaining a set of signal dependent parameters $\mu_k$ is done by obtaining all the distinct solutions $\mu_1 \leq \ldots \leq \mu_M$ to the following equation in $\mu$:

$$\sum_{k=1}^{M} \frac{\hat{\lambda}_k}{\hat{\lambda}_k - \mu} = N.$$

11. The method according to claim 10, wherein if N<M, $\mu_1 = \ldots = \mu_{M-N} = 0$ and wherein $\mu_{M-N+1} \leq \ldots \leq \mu_M$ are the positive solutions to said equation in $\mu$.

12. The method according to claim 1, wherein the step of constructing a set of weights $\phi_m$ is done by applying the following equation:

$$\varphi_m = \begin{cases} 1 & m \leq [M-N]^+ \\ 1 - \Phi_m + \Psi_m & [M-N]^+ + 1 \leq m \leq M - K \\ -\Phi_m & m > M - K \end{cases}$$

wherein K is the number of sources and therefore the number of waveforms ($w_a$, $w_b$, $w_c$ ...) received at the M receiving units (1, 2, 3, 4 ...) and wherein:

$$\Phi_m = \sum_{k=[M-N]^+ + 1}^{M-K} \frac{\hat{\lambda}_m(\hat{\lambda}_k - \mu_k)}{(\hat{\lambda}_m - \hat{\lambda}_k)(\hat{\lambda}_m - \mu_k)}$$

$$\Psi_m = \sum_{\substack{k=[M-N]^+ + 1 \\ k \neq m}}^{M} \frac{\hat{\lambda}_k(\hat{\lambda}_m - \mu_m)}{(\hat{\lambda}_k - \hat{\lambda}_m)(\hat{\lambda}_k - \mu_m)}$$

where $$[M-N]^+ = \begin{cases} M - N & \text{if } M > N \\ 0 & \text{otherwise.} \end{cases}$$

13. The method according to claim 1, wherein the sample spatial correlation matrix $\hat{R}$ takes the form of:

$$\hat{R} = \frac{1}{N} \sum_{n=1}^{N} y(n) y^H(n).$$

14. The method according to claim 1, wherein the sample spatial correlation matrix $\hat{R}$ takes any other form from the ones known in the art.

15. The method according to claim 12, wherein the step of finding the K solutions from the cost function is done either by selecting K deepest local minima of the following cost function:

$$f(\eta(\theta))$$

where $f(\cdot)$ is an increasing real-valued function, or by selecting the K highest local maxima of the following cost function:

$$g(\eta(\theta))$$

where g(•) is a decreasing real-valued function, and wherein $$\eta(\theta) = a^H(\theta)\left(\sum_{m=1}^{M} \varphi_m \hat{e}_m \hat{e}_m^H\right)a(\theta); \text{ and}$$

further comprising the step of acquiring and storing, at the signal processing unit (40), the values of a column vector a(θ), said column vector a(θ) having M rows corresponding to respective M receiving elements, each of the M rows comprising a function which depends on the direction of arrival θ that is to be explored.

16. The method according to claim 12 wherein, when the M receiving elements (1, 2, 3, 4 . . . ) form a uniform linear array, the method further comprises the steps of:
constructing the matrix $$\Gamma = \sum_{k=1}^{M} \varphi_k \hat{e}_k \hat{e}_k^H;$$

constructing a polynomial $$D(z) = \sum_{l=-(M-1)}^{M-1} \alpha_l z^{M-l-1}$$

wherein $$\alpha_l = \begin{cases} \sum_{m=1}^{M-l} \Gamma_{m,m+l} & l = 0 \ldots (M-1) \\ \alpha_{-l}^* & l = -(M-1) \ldots -1, \end{cases}$$

and (•)* denotes complex conjugate and $\Gamma_{m,n}$ denotes the entry corresponding to the mth row and the nth column of the matrix Γ;
choosing $z_1, \ldots, z_K$ from the roots of the complex polynomial D(z), as those that either minimize the quantity f(|D(exp(jarg($z_k$)))|),
wherein f(•) is an increasing real-valued function, or maximize the quantity g(|(exp(jarg($z_k$)))|)
wherein g(•) a decreasing real-valued function,
and wherein j is the imaginary unit, arg(•) denotes the argument of a complex number and ‖ denotes the module of a complex number;
obtaining, from those $z_1, \ldots, z_K$, the K estimated directions-of-arrival:

$$\theta_1 = \arcsin\left(\frac{\lambda}{2\pi d}\arg(z_1)\right)$$
$$\vdots$$
$$\theta_K = \arcsin\left(\frac{\lambda}{2\pi d}\arg(z_K)\right)$$

wherein d denotes the distance between the elements of the array and λ is the wavelength of the impinging waveforms.

17. The method according to claim 12, wherein, when the M receiving elements (1, 2, 3, 4 . . . ) form a uniform linear array, the method further comprises the steps of:
dividing the array of M elements into $M_{ss}$ smaller subarrays, each containing L receiving elements, $M_{ss}$ and L being natural numbers;
dividing each of the N column vectors y(1), . . . , y(N) into $M_{ss}$ smaller column vectors $Y_{Mss}(1), \ldots, Y_{Mss}(N)$, each of said smaller column vectors having L rows;
calculating $M_{ss}$ sample spatial correlation matrices at each of the $M_{ss}$ smaller subarrays;
averaging said $M_{ss}$ sample spatial correlation matrices and constructing an averaged L×L spatial correlation matrix $\hat{R}$ therefrom;
constructing a column vector $a_{ss}(\theta)$ by selecting the first L rows of a(θ);
selecting either K deepest local minima of the following cost function:

f(η(θ))

wherein f(•) is an increasing real-valued function,
or K highest local maxima of the following cost function g(η(θ))

where g(•) is a decreasing real-valued function, and $$\eta(\theta) = a^H(\theta)\left(\sum_{m=1}^{M} \varphi_m \hat{e}_m \hat{e}_m^H\right)a(\theta); \text{ and}$$

further comprising the step of acquiring and storing, at the signal processing unit (40), the values of a column vector a(θ), said column vector a(θ) having M rows corresponding to respective M receiving elements, each of the M rows comprising a function which depends on the direction of arrival θ that is to be explored.

18. The method according to claim 12, wherein the step of finding K solutions from a certain cost function is done by selecting K local extrema of said cost function by means of a process of K iterations, wherein at the kth iteration, k=1 . . . K, the kth local extremum is selected as either the corresponding minimum of the cost function f($\theta_k(\theta)$)

wherein where f(•) is an increasing real-valued function, or the corresponding maximum of the cost function g($\theta_k(\theta)$)

wherein g(•) is a decreasing real-valued function,
and wherein $$b_k(\theta) = \frac{[I - A_k(A_k^H A_k)^{-1}A_k^H]a(\theta)}{\|[I - A_k(A_k^H A_k)^{-1}A_k^H]a(\theta)\|},$$

$$A_k[a(\theta_1), \ldots, a(\theta_{k-1})]$$

and wherein $\theta_1, \ldots, \theta_{k-1}$ are the local extrema selected in previous iterations and ‖•‖ denotes the Euclidean norm of a vector; and
further comprising the step of acquiring and storing, at the signal processing unit (40), the values of a column vector a(θ), said column vector a(θ) having M rows corresponding to respective M receiving elements, each of the M rows comprising a function which depends on the direction of arrival θ that is to be explored.

19. The method according to claim 12, further comprising the step of enhancing the resolution of the algorithm across selected regions of directions-of-arrival, by multiplying the sample values obtained at the signal processing unit (40) by a $M_b×M$ matrix B, where M<$M_b$, wherein the values of the matrix B depend on the array geometry of the receiving elements.

20. The method according to claim 19, wherein the sample spatial correlation matrix $\hat{R}$ takes the form of:

$$\hat{R}_B = B^H \left( \frac{1}{N} \sum_{n=1}^{N} y(n) y^H(n) \right) B.$$

21. The method according to claim 20, wherein the directions-of-arrival of the signals of interest are estimated by either selecting K deepest local minima of the cost function $f(\eta_B(\theta))$ wherein f(•) is an increasing real-valued function, or selecting K highest local maxima of the cost function $g(\eta_B(\theta))$ wherein g(•) is a decreasing real-valued function,
and wherein $$\eta_B(\theta) = \frac{a^H(\theta) B \left( \sum_{m=1}^{M} \varphi_m \hat{e}_m (\hat{e}_m)^H \right) B^H a(\theta)}{a^H(\theta) B B^H a(\theta)}.$$

22. The method according to claim 1, wherein said at least one receiving waveform ($w_a$) is a radio-frequency signal or a microwave signal.

23. A system comprising means adapted for carrying out the steps of the method according to claim 1.

24. The system according to claim 23, wherein the receiving units (1, 2, 3, 4 . . . ) are an array of M sensor or antenna elements.

25. The system according to claim 23, wherein the M pre-processing units (30, 31, 32, 33 . . . ) are radio-frequency or acoustic front-ends (30, 31, 32, 33 . . . ).

26. The system according to claim 23, wherein the at least one received waveform ($w_a$) is generated by at least one source.

27. The system according to claim 26, wherein said at least one source is a transmitter.

28. The system according to claim 26, wherein said at least one source is a reflector of the acoustic or radio waveform generated by other sources.

29. The system according to claim 23, wherein said at least one receiving waveform ($w_a$) is a radio-frequency signal or a microwave signal.

30. A computer program comprising computer program code means adapted to perform the steps of the method of claim 1 when said program is run on a computer, a digital signal processor, a field-programmable gate array, an application-specific integrated circuit, a micro-processor, a micro-controller, or any other form of programmable hardware.

* * * * *